(12) United States Patent
Mayr

(10) Patent No.: US 8,193,876 B2
(45) Date of Patent: Jun. 5, 2012

(54) DC AND/OR AF OUTPUT FROM AN RF PATH

(75) Inventor: Ingo Mayr, Niederndorf (AT)

(73) Assignee: Kathrein-Austria Ges.m.b.H., Kufstein (AT)

( * ) Notice: Subject to any disclaimer, the term of this patent is extended or adjusted under 35 U.S.C. 154(b) by 249 days.

(21) Appl. No.: 12/083,934

(22) PCT Filed: Nov. 16, 2006

(86) PCT No.: PCT/EP2006/011018
§ 371 (c)(1),
(2), (4) Date: Apr. 22, 2008

(87) PCT Pub. No.: WO2007/057196
PCT Pub. Date: May 24, 2007

(65) Prior Publication Data
US 2009/0256648 A1 Oct. 15, 2009

(30) Foreign Application Priority Data
Nov. 17, 2005 (DE) .......................... 10 2005 054 916

(51) Int. Cl.
*H03H 7/46* (2006.01)
*H01G 4/00* (2006.01)
(52) U.S. Cl. ...................... 333/132; 361/301.2; 361/302
(58) Field of Classification Search .......... 333/208–212, 333/227–233, 185, 132, 134–136; 361/301.2, 361/302
See application file for complete search history.

(56) References Cited

U.S. PATENT DOCUMENTS

| 3,179,816 A | 4/1965 | Hall et al. |
| 4,996,506 A * | 2/1991 | Ishikawa et al. ........... 333/219.1 |
| 5,296,825 A | 3/1994 | Tsuruoka |
| 2005/0225411 A1 * | 10/2005 | Sauder et al. ................. 333/202 |

FOREIGN PATENT DOCUMENTS

| EP | 0 746 051 | 12/1996 |
| JP | 10-290131 | 10/1998 |
| WO | 2006/087024 | 8/2006 |

OTHER PUBLICATIONS

International Search Report for PCT/EP2006/011018 mailed Nov. 16, 2006.

* cited by examiner

*Primary Examiner* — Benny Lee
*Assistant Examiner* — Gerald Stevens
(74) *Attorney, Agent, or Firm* — Nixon & Vanderhye P.C.

(57) ABSTRACT

An improved DC and/or audio-frequency output for RF paths has the following features: an earth connection is provided, in particular in the form of an electrically conductive housing (17), an output path (13) branches off from a connection point (117, 117') on an RF path (3, 5), the output path (13) comprises a branch line (7, 9), originating from the connection point (117, 117'), in the form of a λ/4 line, where λ represents a wavelength which corresponds to a wavelength within the RF band to be transmitted on the RF path (3, 5), and having a capacitor device (27a, 27b), which is connected to the branch line (7, 9), in the form of a low-pass filter and/or an RF short, with at least one sealed dipole connection (127a, 127h) also being provided on the output path (13), in addition to the at least one capacitor device (27a, 27b).

29 Claims, 3 Drawing Sheets

DC AND/OR AF OUTPUT FROM AN RF PATH

CROSS-REFERENCES TO RELATED APPLICATIONS

This application is the U.S. national phase of International Application No. PCT/EP2006/011018 filed 16 Nov. 2006 which designated the U.S. and claims priority to German Patent Application No. 10 2005 054 916.0 filed 17 Nov. 2005, the entire contents of each of which are hereby incorporated by reference.

STATEMENT REGARDING FEDERALLY SPONSORED RESEARCH OR DEVELOPMENT

Not applicable.

FIELD

The technology herein relates to a direct voltage and/or AF output from an RF path, in particular a direct voltage and/or AF circumvention from an RF path, preferably in the form of radio-frequency filters, duplexers or the like.

BACKGROUND AND SUMMARY

In particular in receiving and transmitting technology it is frequently conventional on a receiving and/or transmitting path to not only relay the radio-frequency signals to be transmitted or to be received (called RF signals in brief below), but to also supply, via this path, the active components integrated into the connected antennae, amplifiers, pre-amplifiers etc., with direct voltage for the current supply and/or to also at least transmit via the path the audio-frequency (AF) alternating voltages (for example pilot signals) to control and regulate the components.

Additional apparatuses provided on the receiving or transmitting paths such as in particular radio-frequency filters are however, frequently not in a position here to also accept and transmit the direct voltage and/or audio-frequency alternating voltage also required for the current supply in addition to the radio-frequency signals, for example for the pilot signals mentioned, as the problem is that direct voltage and/or AF outputs of this type have to be designed such that they as far as possible do not change the properties of the filter. In turn, this only functions when the circumventions to the RF lines are decoupled (which frequently takes place using a coil or a λ/4 line) and consequently only extremely highly damped radio-frequency signals can be transmitted on the output path. A conventional technique is therefore to provide a circumvention in the form of an output or bypass path by means of which a direct voltage also transmitted on the radio-frequency path or an audio-frequency alternating voltage can be output and input again into the radio-frequency path at another point. As a result, for example, a radio-frequency path provided with a radio-frequency filter or a duplexer can be circumvented or bridged.

For this purpose, solutions were hitherto known, in which for example, a coil or a λ/4 line or one or more conductor plates with multi-stage low-pass filters were used, which were generally discretely constructed.

For space reasons, it has also already been proposed to use a λ/4 line together with so-called bushing capacitors, in which a dielectric circumventing the line was provided on the bypass path in the input or in the output region of the λ/4 line, which dielectric was surrounded by a cylindrical sleeve producing the capacitor, which sleeve had to be soldered in a corresponding recess, for example in a housing wall of a radio-frequency filter or duplexer. Various drawbacks were connected with this technology, however.

An input and output circuit for direct voltage and/or audio-frequency signals for RF paths is, for example, also known from U.S. Pat. No. 5,296,825 A. This input/output circuit has an output path via a resistor and a capacitor connected in series thereto. The output path also comprises a transformation line, the electrical length of which is $\lambda/4 \pm \Delta$ wherein a $\lambda$ corresponds to a wavelength on the RF path. The capacitor device mentioned makes possible a short for a certain frequency.

The decoupling cannot, however, be described as adequate in each case.

The object of the exemplary illustrative non-limiting technology herein is therefore to provide an improved direct voltage and/or audio-frequency circumvention and/or output for a radio-frequency path, in particular for radio-frequency filters, duplexers or other electrical/electronic apparatuses, which is constructed simply and is highly effective from the electrical point of view.

Apart from a further cost saving, the advantage according to an exemplary illustrative non-limiting implementation is inter alia that the corresponding direct voltage and/or audio-frequency voltage output and/or circumvention can be much more easily assembled or also disassembled in the case of repair work. In addition, simple standard parts may be used which make special manufacturing superfluous. Finally, the outlay for space is much less compared to conventional solutions as, for example, no so-called temperature traps, which were previously otherwise necessary, have to be integrated in the housing.

BRIEF DESCRIPTION OF THE DRAWINGS

Further advantages, details and features will be better and more completely understood by referring to the following detailed description of exemplary non-limiting illustrative implementations shown with the aid of the drawings, in which.

DETAILED DESCRIPTION

Figure 1:
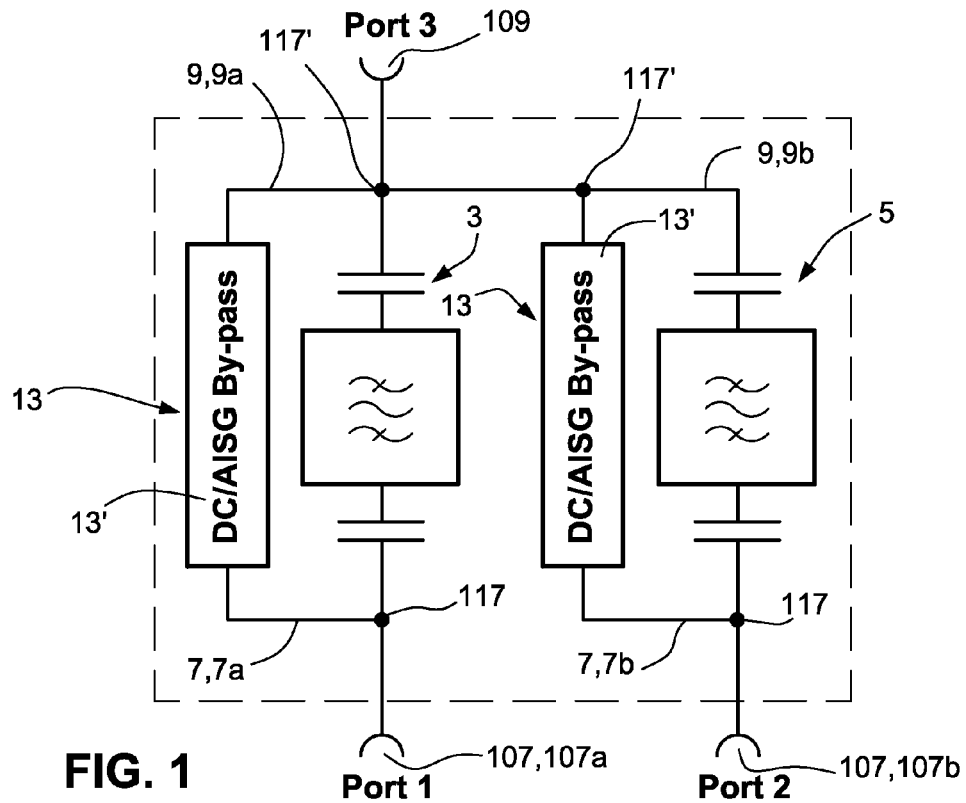
FIG. 1 shows a schematic view of a duplexer with two RF branches, in which a bypass path for a direct voltage and/or audio-frequency circumvention and/or output is provided.
Figure 1A:
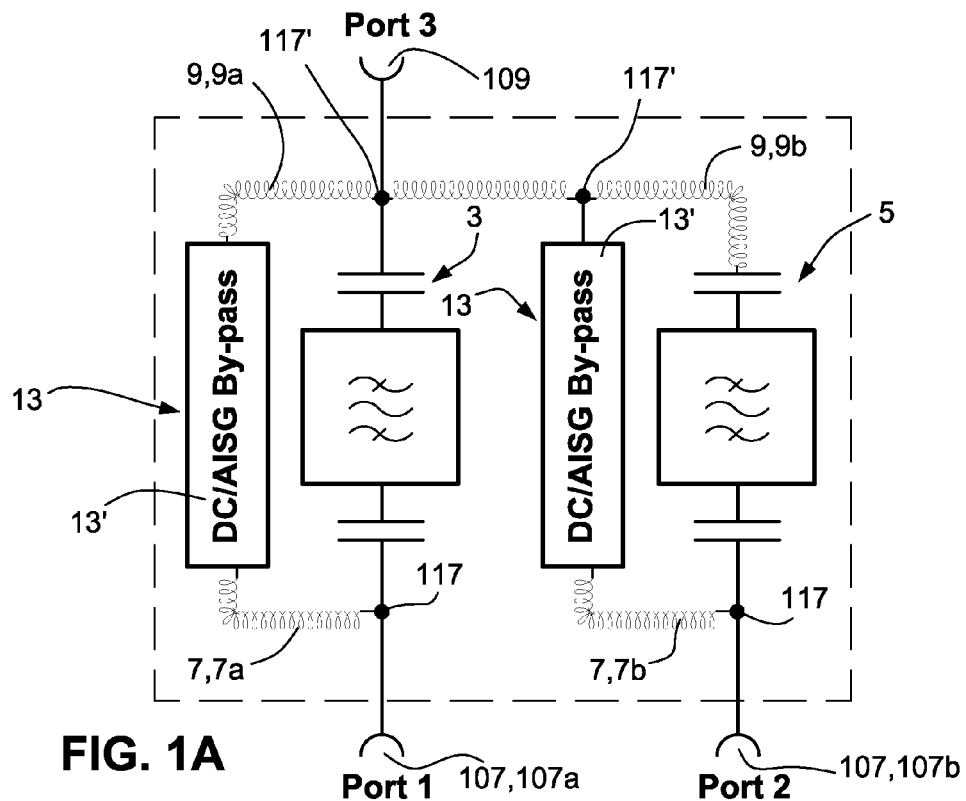
FIG. 1A shows a schematic view of a duplexer with two RF branches running in the form of a coil, in which a bypass path for a direct voltage and/or audio-frequency circumvention and/or output is provided.

FIGS. 1, 1A shows a schematic view of a block diagram for a duplexer, which comprises two band passes 3 and 5, for example a first band pass of 806 MHz to 960 MHz and for example a second band pass of 1,710 MHz to 2,170 MHz.

A duplexer configured in this manner thus has, for example, two input-side RF connections and/or corresponding connections 107, namely 107a and 107b, and a third output-side RF connection bringing together the two band pass paths and/or a corresponding connection 109, to which an antenna is usually connected. In the case of a corresponding duplexer for a transmitting or receiving system, the input-side RF connections 107a, 107b mentioned would be used as transmitting inputs and the third RF connection 109 as a transmitting output, whereas in the case of receiving, the third RF connection 109 could be called a receiving input and the two further connections 107a and 107b, receiving outputs.

It can also be seen from the schematic block diagram that an AF and direct voltage circumvention 13 is provided for each band pass 3 and 5, respectively, which will be called in brief below a bypass or circumvention path or sometimes also an output path 13. On the one hand, therefore, a direct voltage supply for various apparatuses, amplifiers etc. is to be ensured via this bypass or output path 13 and/or, for example, an audio-frequency signal transmission is to be possible, for example in the form of so-called pilot signals, which are required to control and regulate individual components (for example also in the diseq technique).

The bypass or output path 13, in addition to an output or bypass circuit 13' comprises here, on the input side, an input line 7, i.e. an input line 7a or 7b in the embodiment shown, and, on the output side, an output line 9, i.e. an output line 9a or 9b in the embodiment shown. In this case, therefore, the input lines 7 are electrically connected at a connecting or branch point 117 to the RF path 3 and the output lines 9 are electrically connected at a connecting point 117' to the relevant RF path 3 or 5, in the embodiment shown, electrically-galvanically.

Figure 2:
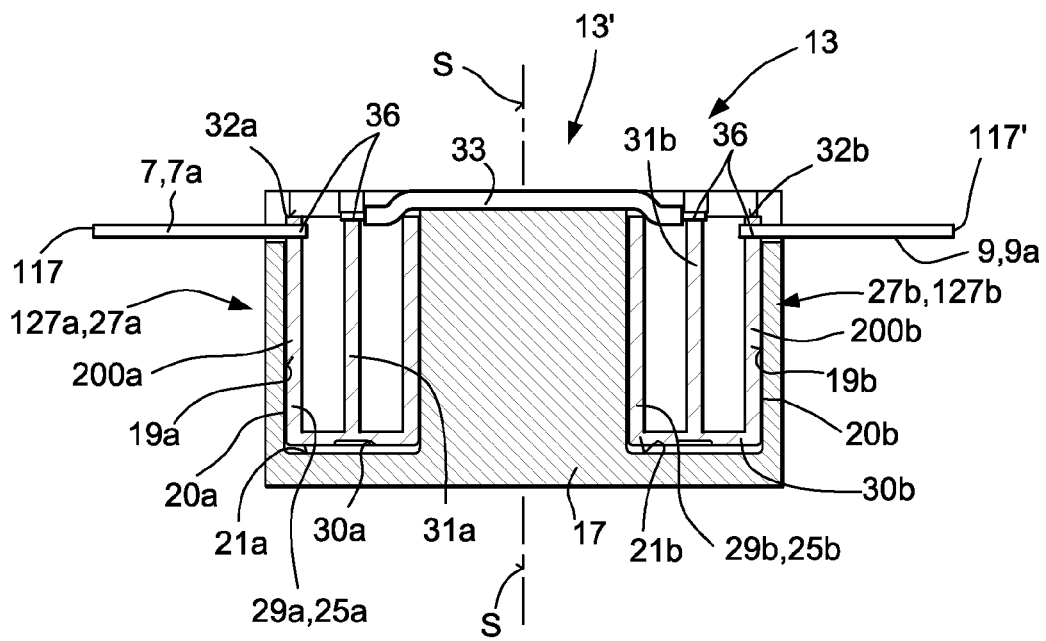
FIG. 2 shows a schematic axial sectional view through a first embodiment for a circumvention path.
Figure 3:
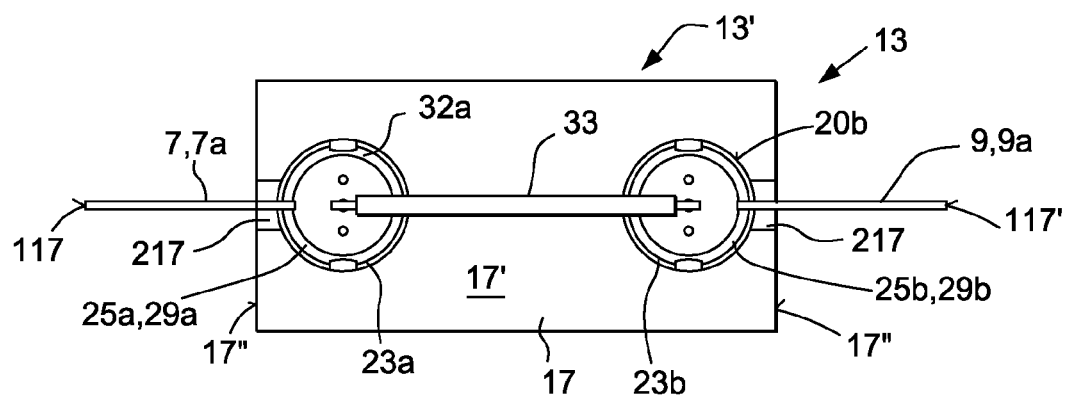
FIG. 3 shows a plan view of the embodiment according to FIG. 2.
Figure 4:
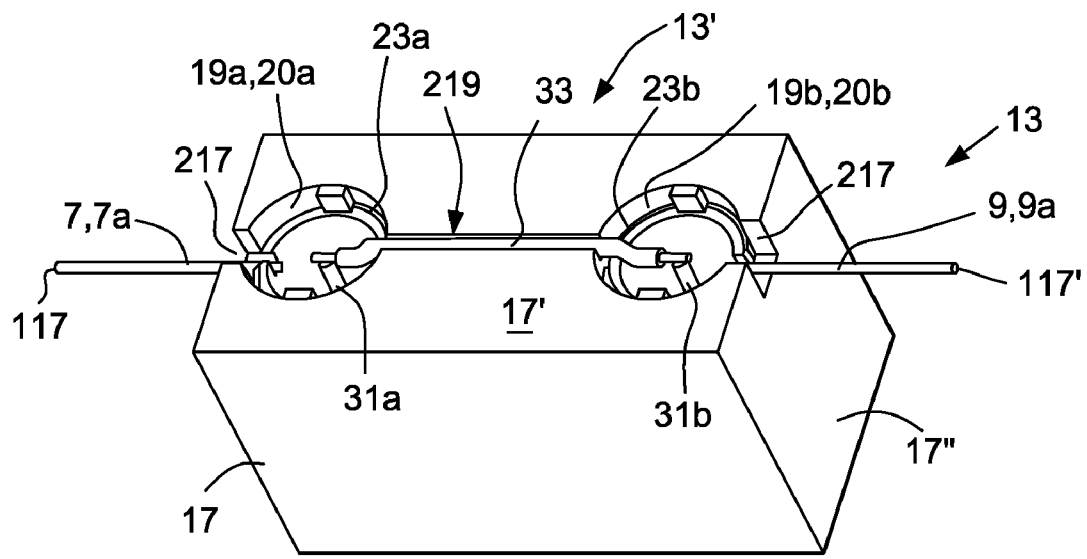
FIG. 4 shows a spatial view of the embodiment according to FIGS. 2 and 3.

A bypass or output path 13 of this type is shown in greater detail with the aid of FIGS. 2 to 4.

On the one hand, it can be seen therefrom that the bypass path 13 comprises a housing 17 (which is connected to earth), which consists of electrically conductive material, conventionally a corresponding metal alloy or else comprises at least a conductive outer casing or cover if it is produced, for example, from plastics material. A housing 17 is generally provided in which the radio-frequency path is also implemented in the form of the at least one or more band passes 3, 5. In the embodiment shown, for the sake of simplification and a better overview, only one housing 17 is shown which also comprises the bypass path 13 and not the additional radio-frequency path as well, for example forming a radio-frequency filter, duplexer etc.

In the embodiment shown, two hollow-cylindrical bores or recesses 19a or 19b are thus introduced into the housing 17 from one side. Two hollow cylindrical capacitor walls are thus formed, which are virtually the first plates, in other words the first capacitor halves 20a and 20b of a capacitor 27a or 27b described below in further detail.

A dielectric 23a or 23b, for example in the form of a cylindrical dielectric, which can be configured as a plastics material injection molding, is inserted in this hollow cylindrical bore 19a or 19b, in each case. This dielectric is preferably designed in the form of a pot and can be inserted, up to the lower base 21a or 21b into the hollow cylindrical bores 19a, 19b.

An electrically conductive hollow cylinder 25a or 25b is then inserted into this dielectric 23a, 23b formed in this manner and forms the second plate, in other words the second capacitor half 200a or 200b of a cylindrical capacitor 27a or 27b configured in this manner.

The inner second halves of the cylindrical capacitors 27a, 27b are not configured in the embodiment shown as a pure hollow cylinder, but as cylindrical pots 29a or 29b, namely in a coaxial mode of construction with a respective associated inner conductor 31a or 31b, which extend from the respective pot base 30a or 30b and, in the embodiment shown, extend up to the respective upper edge 32a or 32b of the associated cylinder pot 29a, 29b.

As can be seen from FIGS. 2 to 4, the cylindrical pots 29a, 29b, which are provided with a lateral offset in the housing 1 in the corresponding bores 19a, 19b are configured the same. The two inner conductors 31a, 31b, in other words the two cylindrical pots 29a, 29b are connected to one another by means of a line 33 sometimes also called a connecting line 33 below. This line may have any length.

The input line 7, 7a thus forms an input-side RF connection, which branches off from a connecting or branch point 117 from the RF path 3 shown in FIG. 1, and leads, in this case, to the hollow cylinder 25a of the first cylindrical pot 29a and is electrically connected thereto, preferably by soft soldering (the point at which the connection takes place by soft soldering is provided with the reference numeral 36). For this purpose, the input line 7 or the RF connection is soldered at the upper edge 32a opposing the pot base 30a of the cylindrical pot 29a.

The input line 7, 7a is a transmission line in this case, the length of which is preferably $\lambda/4$. The input line 7a thus preferably has the length, which corresponds to the medium wavelength of a frequency band to be transmitted on the associated RF path. $\lambda$ is at least selected such that the value of this corresponds to a wavelength for a frequency which lies within the frequency band to be transmitted on the radiofrequency path.

An output line 9' representing the output-side RF connection, in other words the output-side RF connection 9 is likewise in turn soldered to the upper edge 29b of the cylindrical pot 29b (preferably also again by soft soldering 36), said output line being connected at the opposing end of the cylindrical pot 29b at a connecting point 117' to the associated RF path 3 or 5. This RF connection 9 or the corresponding output line 9 has a length here which corresponds to $\lambda/4$, $\lambda$, preferably in turn corresponding to the medium wavelength of the frequency band, which is to be transmitted on the associated RF path. $\lambda$ should be at least selected such that the value for this corresponds to a wavelength for a frequency which lies within a frequency band to be transmitted on the RF path.

In the embodiment shown, it can be seen that a recess 217 to the end opposing limiting portions 17" of the housing 17 is provided on the housing 17 on the upwardly pointing housing wall 17', in each case, through which recess the input or output line 7, 9 can be guided out from the upper edge 32a or 32b of the two cylindrical pots 29a and 29b, which are configured as blocking pots 127a and 127b, for example parallel to the upper limiting wall 17' of the housing 17, since the axial bores 19a and 19b are also introduced in the housing 17 so deeply that the blocking pots 127a, 127b are immersed in the full axial length in these bores and do not project upwardly with their upper edge 32a or 32b above the upper limiting wall 17' of the housing. Thus, the input and output line 7 or 9 could also be guided out laterally below the upper plane of the limiting wall 17' of the housing. Finally, it can also be seen, in particular from FIGS. 2 and 4 that the connecting line 33 is laid in a housing recess 219 (FIG. 4) which, in a slot-shape connects the two cylindrical bores 19a and 19b in the region of the upper limiting wall 17' of the housing 17, so that this line 33 does not project over the upper limiting plane 17' of the housing either. The measures mentioned last may, however, also be configured differently from this.

A direct voltage for the current supply and/or audio-frequency (AF) alternating voltage (for example pilot signals) can be transmitted by a bypass line or circumvention 13 formed in this manner, in other words parallel to a radiofrequency path (for example band pass path 3, 5 in FIG. 1). In this case, the hollow cylindrical capacitor wall 20a or 20b, for example, forms the respective first "plate" of a capacitor 27a or 27b configured in this manner. The second "plate" of the capacitor is formed by the electrically conductive hollow cylinder 25a or 25b inserted in the hollow cylindrical bores 19a, 19b, the two "plates", being separated electrically galvanically from one another by the dielectric 23a, 23b mentioned.

In this case, the dielectric 23a, 23b, and also the hollow cylinder 25a, 25b inserted therein in each case and designed in the manner of a cylindrical pot 29a, 29b, can be configured such that they can be inserted into the hollow cylindrical bore 19 producing a snap and/or latching effect. Corresponding snap and/or latching devices or at least adequate clamping measures or devices can also be provided and/or configured on the dielectric 23a, 23b preferably consisting of plastics material in cooperation with the corresponding recess in the housing.

The capacitors 27a, 27b mentioned form a low-pass filter producing a short in terms of radio-frequency with the conductive housing 17, which is generally connected to earth. Nonetheless, the capacitors 27a, 27b thus mentioned acting as a short in terms of radio-frequency are not yet sufficient for an optimal decoupling relative to the RF branch, as a residual signal which is still too large or a residual signal intensity which is too large would be transmitted via this bypass path. In order to further improve the output, a blocking pot 127a, 127b is integrated in each case into the capacitors 27a, 27b in accordance with the embodiment outlined. This blocking pot 127a, 127b is in each case formed by the cylindrical pot 29a, 29b with the associated, concentrically arranged inner conductor 31a, 31b, which is connected to the respective base 30a, 30b of the relevant cylindrical pot 29a, 29b. The connection line 7 or 9 is then connected directly to this blocking pot 127a or 127b and therefore satisfies the decoupling.

The axial length (above all the axial length in the interior of the cylindrical pot and therefore the axial length of the inner conductor 21a, 21b) is in this case preferably generally proportional to $1/\sqrt{\in_R}$ and the further factor $\lambda/4$, wherein $\in_R$ is the corresponding dielectric constant of the inner dielectric used, which in the embodiment shown preferably consists of air but does not have to consist of air. Another dielectric may also be inserted here. $\lambda$ is preferably the medium wavelength of the frequency band to be transmitted in the RF branch. By means of the use of the blocking pot 127a, 127b thus formed, a short is produced in the base region 20a, 20b of the blocking pot via the capacitor 27a, 27b thus formed, this short being transferred to the open end of the blocking pot 127a, 127b in a no-load operation ($\lambda/4$ electrical length). However, the axial length of the blocking pots or the inner conductor of the blocking pots does not absolutely have to be $\lambda/4$, but may differ from this and have completely different values. The length of the input line 7, 7a or 7b is more decisive but also the length of the output line 9, i.e. in the embodiment shown according to FIG. 1, the output line 9a or 9b.

It is thus ensured by the structure shown that, for example, the short at the first blocking pot 127a, in other words the short at the connecting point of the so-called $\lambda/4$ input line with the blocking pot 127a (at the soft soldering point 36) is transformed in a no-load operation at the connecting point 117 to the RF path 3, so as a result the RF filter does not undergo any influencing or change through the output or circumvention path. The same applies to the second $\lambda/4$ connection line 9, in which the short at the blocking pot 127a, in other words at the connecting point of the $\lambda/4$ line 9 to the blocking pot 127b is also transformed into a no-load operation at the connecting point 117' to the RF path, so the RF branch there does not experience any disadvantageous influencing here either through the output or circumvention path.

As in the embodiment shown according to FIG. 1 and FIGS. 2 to 4, a direct voltage and/or RF circumvention has been described, in other words a second connecting point 117' is provided with the associated RF branch, the configuration is symmetrically constructed in the embodiment shown. The first of the two symmetrical halves according to the embodiment in accordance with FIGS. 2 to 4, consists of an output path, namely, in the embodiment shown, proceeding from the connecting point 117 in the form of the following $\lambda/4$ line 7, which leads to the cylindrical pot 29a, in other words to the blocking pot 127a. The second half of the cylindrical structure proceeds from a connecting point 117' from the RF path, specifically via a downstream $\lambda/4$ line 9, 9a, which leads to the downstream cylindrical pot 29b, in other words to the blocking pot 127b. The two blocking pots are then connected to one another via the line 33 mentioned. The structure which is in principle symmetrical, at least from the functional point of view, is indicated in FIG. 2 with regard to the plane of symmetry S.

Figure 5:
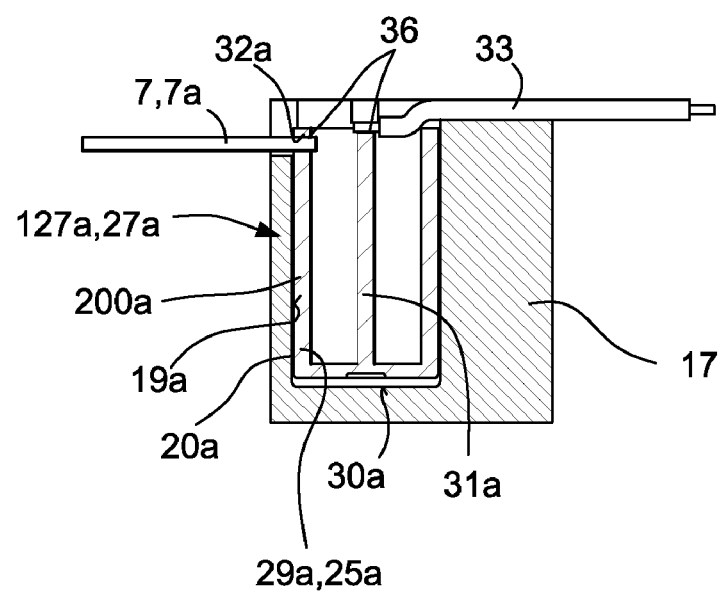
FIG. 5 shows a schematic axial sectional view through an exemplary illustrative non-limiting embodiment in the form of an output path.

If, nevertheless, no circumvention path is implemented (in which a coupling to the RF path is provided at both opposing ends 117 or 117') but only an output path, which is only connected via a branching point 117 (or 117') to the RF path, and leads away therefrom, it would be sufficient if after the branching point 117 and the transformation line, i.e. the $\lambda/4$ input line 7 a short in terms of radio-frequency in the form of a first capacitor 27a in the form of the blocking pot 127a mentioned would initially follow, so that a line 33 could be then connected to the free end of the inner conductor 31a, in which line a direct voltage and/or audio-frequency signal can be picked up. In other words, only half the device would be necessary as shown schematically in FIG. 5.

The embodiment shown in FIGS. 1 to 4 is not, however, an output path but a circumvention or bypass path 13, which, at both connections 7 and 9, has a connection to the RF path 3 or 5, so the structure is symmetrical with the result that viewed from each side of the two connecting points 117, 117', a first $\lambda/4$ line 7' or 9' and a blocking pot 127a, 127b are firstly connected downstream. In this case, each short capacitor 27a, 27b also simultaneously forms the blocking pot described.

A $\lambda/4$ line 7 or 9 has been constantly referred to in the embodiments shown, where $\lambda$ is to correspond to a frequency within a frequency band, which is transmitted to the parallel radio-frequency branch. $\lambda$ should preferably correspond to the medium wavelength of the corresponding band transmitted to the radio-frequency branch. The advantages can be achieved to an adequate extent however even when the length of the connecting line 7 or 9 is not exactly $\lambda/4$, but differs therefrom.

A range of $\lambda/8$ to $3\lambda/8$ and in particular a range of preferably $3\lambda/16$ to $5\lambda/16$ generally still leads to adequate results. In this case, the electrical length L for the transformation line in question can generally be described as follows:

$$L = \lambda/4 \pm < \lambda/8$$

and in particular $$L = \lambda/2 \pm \lambda/16$$

wherein $\lambda$ is, in this case in turn preferably the medium wavelength of the frequency band to be transmitted in the RF path or at least a wavelength within this RF frequency band.

In principle, the aforementioned length of this transformation path 7 or 9 may, however, also be lengthened by $\lambda/2$ to arrive at the same result. The electrical length of the transformation line 7 or 9 may, in other words, generally be circumscribed as follows:

$$L=\lambda/4+n\lambda/4\pm<\lambda/8$$

and in particular $$L=\lambda/4+n\lambda/4\pm\lambda/16$$

wherein the electrical length is preferably $$L=\lambda/4+n\lambda/2.$$

"n" is therefore a natural integer including 0, in other words, for example, n=0, 1, 2, 3 etc., where λ is in turn a wavelength and preferably the medium wavelength of the radio frequency band transmitted on the radio-frequency path.

Finally, reference is also made to the fact that the connecting lines 7 or 9, which can sometimes also be called input or output lines 7 or 9, do not absolutely have to run in a straight line, but may also, for example, be arcuate, or, in particular in the form of a coil. The length of the coil, in other words of the wire used for the coil should also preferably have the aforementioned values here.

The invention claimed is:

1. A direct voltage and/or audio-frequency output arrangement for use in RF apparatuses of the type having at least one RF path transmitting RF signals within an RF band, the at least one RF path having a first connecting point, the direct voltage and/or audio-frequency output arrangement comprising
    an electrically conductive housing having a cylindrical bore defined therein, the cylindrical bore having a wall,
    an output path branching from the first connecting point on the RF path,
    the output path comprising a branch line providing a transformation and having an electrical length of $$L=\lambda/4+n\lambda/2\pm<\lambda/8,$$

wherein λ represents a wavelength within the RF band and n represents a non-negative integer n=0, 1, 2, 3 etc., and
    a capacitor device adjoining the branch line and providing a low-pass filter and/or an RF short, the capacitor device comprising a blocking pot further provided on the output path and arranged in the cylindrical bore defined in the housing, the blocking pot having an outer surface, the cylindrical bore wall forming a first plate of the capacitor device and the outer surface of the blocking pot forming a second plate of the capacitor device.

2. The direct voltage and/or audio-frequency output arrangement as claimed in claim 1, wherein the output path comprises a bypass or circumvention path, which runs between the first connecting point and a further connecting point on the at least one RF path, such that, from one of the first and further connecting points to the other of the first and further connecting points, the branch line leads to the blocking pot to provide downstream capacitance, whereas, from the further connecting point, a further branch line also leads to a further capacitor device comprising a further blocking pot, the blocking pot and the further blocking pot each comprising a respective coaxial inner conductor, a connecting line connecting the blocking pot inner conductor with the further blocking pot inner conductor.

3. The direct voltage and/or audio-frequency output arrangement as claimed in claim 2, wherein the arrangement is configured symmetrically in such a way that the branch line and the further branch line have the same electrical length, the branch line and the further branch line being respectively connected on the bypass or circumvention path at the first connecting point and the further connecting point, the branch line and further branch line having free ends, one of the blocking pot and the further blocking pot being connected at the branch line free ends.

4. The direct voltage and/or audio-frequency output arrangement as claimed in claim 3, wherein
    the blocking pot comprises an electrically conductive hollow cylinder inserted inside the cylindrical bore,
    the arrangement further comprises a cylindrical dielectric inserted between the respective first and second capacitor plates,
    the blocking pot being configured as a cylindrical pot comprising the hollow cylinder having a pot base,
    the cylindrical pot forming the blocking pot with the coaxial inner conductor electrically connected to the associated pot base.

5. The direct voltage and/or audio-frequency output arrangement as claimed in claim 4, wherein the connecting line is connected to upper ends of the respective coaxial inner conductors opposing the corresponding pot bases of the blocking pot and the further blocking pot.

6. The direct voltage and/or audio-frequency output arrangement as claimed in claim 5, wherein the connecting line has ends connected to the respective coaxial inner conductors by soft soldering.

7. The direct voltage and/or audio-frequency output arrangement as claimed in claim 4, wherein the branch line and the further branch line are connected to the respective coaxial inner conductors at respective upper edges thereof and the further blocking pot, by soft welding.

8. The direct voltage and/or audio-frequency output arrangement as claimed in claim 2, wherein the branch and the further branch lines are connected to the second capacitor plate.

9. The direct voltage and/or audio-frequency output arrangement as claimed in claim 2, wherein the blocking pot comprises a coaxial inner conductor having an axial height or length corresponding to λ/4, wherein λ is a wavelength at the middle of the RF band.

10. The direct voltage and/or audio-frequency output arrangement as claimed in claim 1, wherein the housing defines a recess at a level of an upper edge of the blocking pot, the branch line being laid through the recess.

11. The direct voltage and/or audio-frequency output arrangement as claimed in claim 1, wherein the electrical length is further defined as $L=\lambda/4+n\lambda/2\pm<\lambda/16$, where $\pm<\lambda/8$ is further defined by $\pm<\lambda/16$.

12. The direct voltage and/or audio-frequency output arrangement as claimed in claim 1, wherein n=0 resulting in the length L of the branch line being L=λ/4.

13. The direct voltage and/or audio-frequency output arrangement as claimed in claim 1, wherein the branch line is straight.

14. The direct voltage and/or audio-frequency output arrangement as claimed in claim 1, wherein the branch line is curved in the form of a coil.

15. A direct voltage and/or audio-frequency output device for use in RF apparatuses including radio frequency filters or duplexers having an RF path capable of transmitting RF signals within an RF band, the RF path comprising first and further connecting points, the direct voltage and/or audio-frequency output device comprising:
    an electrically conductive housing,
    an output path that branches from the first connecting point on the RF path,
    the output path comprising, a branch line providing a transformation and having an electrical length of $$L = \lambda/4 + n\lambda/2 \pm <\lambda/8,$$

where λ represents a wavelength within the RF band and n represents n=0, 1, 2, 3 etc., and a capacitor device adjoining the branch line, the capacitor device providing a low-pass filter and/or an RF short, and first and further blocking pots further provided on the output path, wherein the output path comprises a bypass or circumvention path which runs between the first and further connecting points on the RF path such that, from the first connecting point, the branch line leads to the first blocking pot to provide downstream capacitance, whereas, from the further connecting point, a further branch line leads to the further blocking pot to provide further capacitance, the first blocking pot and the further blocking pot each comprising a respective coaxial inner conductor, a connecting line connecting the first and further blocking pots.

16. The direct voltage and/or audio-frequency output device as claimed in claim 15, wherein the housing defines a cylindrical bore therein, the cylindrical bore having a wall, the first blocking pot being arranged in the cylindrical bore in the housing, the wall of the cylindrical bore in the housing forming a first capacitor element of the capacitor device, the first blocking pot having an outer surface, the outer surface of the first blocking pot forming a second capacitor element of the capacitor device.

17. The direct voltage and/or audio-frequency output device as claimed in claim 16, wherein the first and further branch lines are connected to the second capacitor element.

18. The direct voltage and/or audio-frequency output device as claimed in claim 15, the output device being configured symmetrically in such a way that the branch line and the further branch line have the same electrical length and are connected on the bypass or circumvention path at the first and further connecting points respectively, the branch line and the further branch line each having a free end, the first blocking pot and the further block pot being respectively connected at the free ends of said branch and further branch lines.

19. The direct voltage and/or audio-frequency output device as claimed in claim 15, wherein the housing defines a hollow cylindrical bore having a wall, the capacitor device comprises a cylindrical capacitor formed by the hollow cylindrical bore in the housing, the wall of the hollow cylindrical housing bore forms one electrical face or first capacitor half of the capacitor device, an electrically conductive hollow cylinder is inserted inside the first capacitor half, the hollow cylinder providing a second capacitor half and therefore forming the capacitor device, the output device further comprises a cylindrical dielectric inserted between the respective first and second capacitor halves, the hollow cylinder being configured as a cylindrical pot forming the first blocking pot with a coaxial inner conductor electrically connected to an associated pot base of the hollow cylinder.

20. The direct voltage and/or audio-frequency output device as claimed in claim 19, wherein the connecting line connecting the inner conductors is connected to an upper end of the respective inner conductors opposing the associated pot base.

21. The direct voltage and/or audio-frequency output as claimed in claim 20, wherein the connecting line has ends connected to the inner conductors by means of soft soldering.

22. The direct voltage and/or audio-frequency output device as claimed in claim 19, wherein the branch line and the further branch line are connected by soft welding.

23. The direct voltage and/or audio-frequency output device as claimed in claim 15, wherein the coaxial inner conductors have an axial dimension corresponding to $\lambda/4$.

24. The direct voltage and/or audio-frequency output device as claimed in claim 15, wherein the housing defines a recess, through which the branch line is laid, at the level of an upper edge of the first blocking pot.

25. The direct voltage and/or audio-frequency output device as claimed in claim 15, wherein the electrical length is further defined as $L = \lambda/4 + n\lambda/2 \pm <\lambda/16$, wherein $\pm <\lambda/8$ is further defined by $\pm <\lambda/16$.

26. The direct voltage and/or audio-frequency output device as claimed in claim 15, wherein n=0 resulting in the length L of the branch line being $L = \lambda/4$.

27. The direct voltage and/or audio-frequency output device as claimed in claim 15, wherein the branch line runs in a straight line.

28. The direct voltage and/or audio-frequency output device as claimed in claim 15, wherein the branch line runs in a curved manner in the form of a coil.

29. A direct voltage and/or audio-frequency output arrangement for use with an RF path that conveys RF signals within an RF band, the direct voltage and/or audio-frequency output arrangement comprising:

a grounded, electrically conductive housing having a cylindrical bore defined therein, the cylindrical bore having a wall, a branch line connected to and branching from the RF path, the branch line having an electrical length of $L = \lambda/4 + n\lambda/2 \pm <\lambda/8$ where λ represents a wavelength within the RF band and n represents a non-negative integer;

a cylindrical blocking pot coupled to the branch line and disposed in the housing cylindrical bore, the cylindrical blocking pot having an outer cylindrical surface forming a first capacitor plate, the cylindrical bore wall forming a second capacitor plate opposing the first capacitor plate; and a cylindrical dielectric element disposed between said cylindrical bore wall and said cylindrical blocking pot outer cylindrical surface, the first and second capacitor plates and the cylindrical dielectric element working together to provide a capacitance that filters and/or shorts out radio frequencies of the wavelength λ.

* * * * *